No. 798,280. PATENTED AUG. 29, 1905.
N. T. HANSON.
BUTTER SEPARATOR.
APPLICATION FILED JULY 19, 1904.

2 SHEETS—SHEET 1.

Witnesses
Inventor
N. T. Hanson,
By his Attorneys

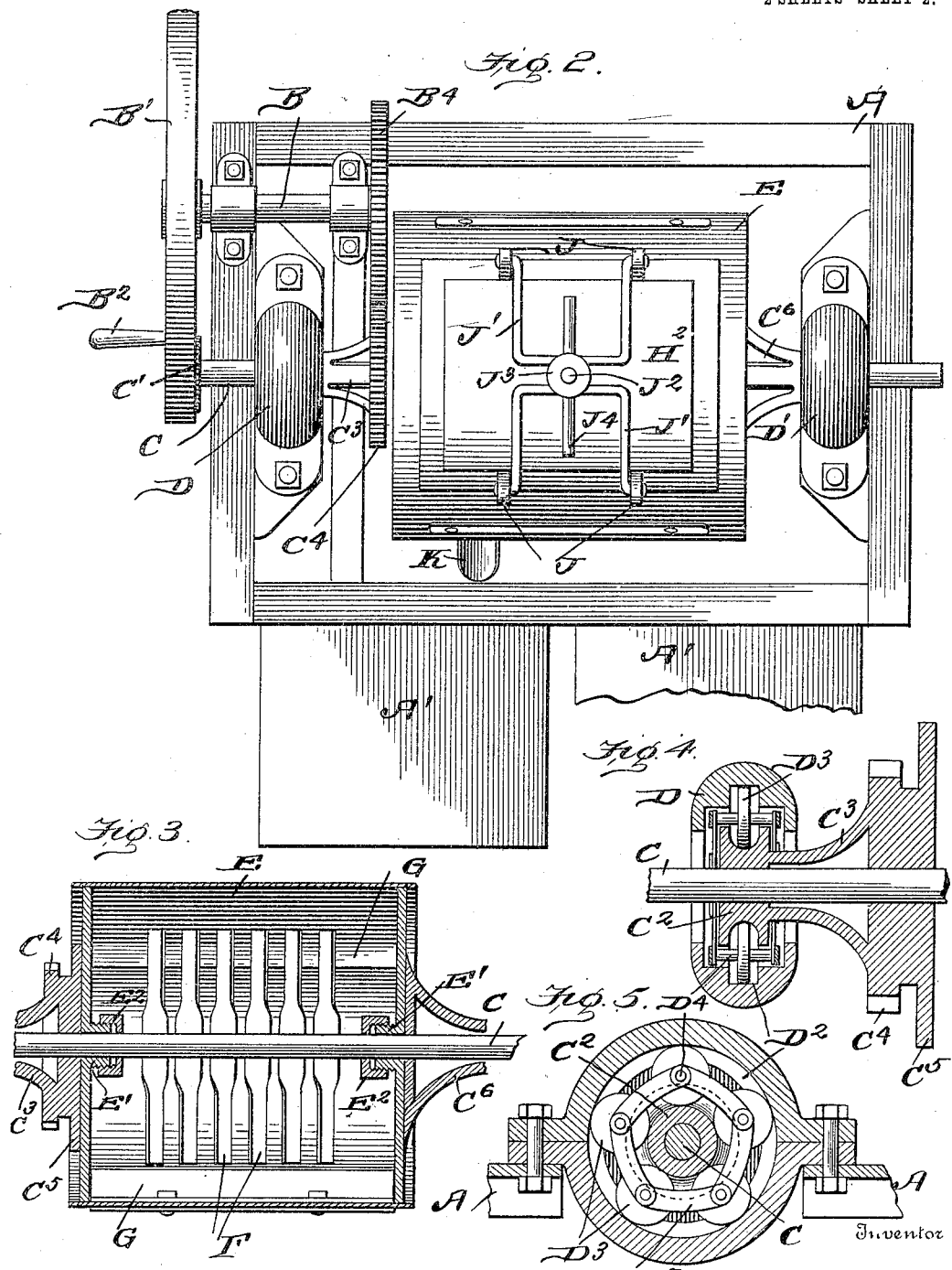

UNITED STATES PATENT OFFICE.

NELS T. HANSON, OF HAWARDEN, IOWA.

BUTTER-SEPARATOR.

No. 798,280. Specification of Letters Patent. Patented Aug. 29, 1905.

Application filed July 19, 1904. Serial No. 217,266.

*To all whom it may concern:*

Be it known that I, NELS T. HANSON, a citizen of the United States, residing at Hawarden, in the county of Sioux and State of Iowa, have invented a new and useful Improvement in Butter-Separators, of which the following is a specification.

This invention relates to a device for separating butter from milk or cream, or recovering from buttermilk the fat left in the same by the ordinary churn.

The object of the invention is to thoroughly separate the butter from milk or cream and to produce a butter which will not require artificial coloring-matter to be added thereto.

My invention consists, essentially, of a drum or cylinder having inwardly-extending flanges and adapted to be rotated in one direction while the shaft upon which the drum or cylinder is loosely mounted and which carries a plurality of paddles is rotated in the opposite direction.

My invention also consists of the novel features of combination and construction hereinafter described, particularly pointed out in the claims, and shown in the accompanying drawings, in which—

Figure 1:
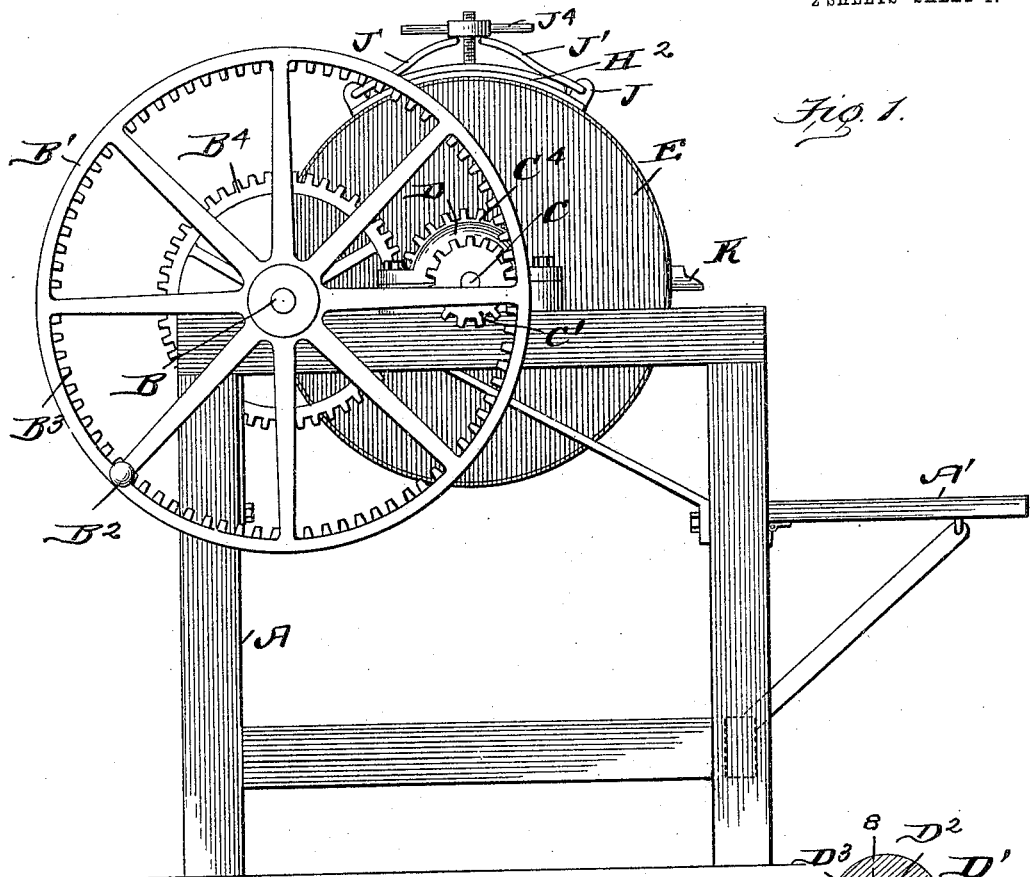
Figure 6:
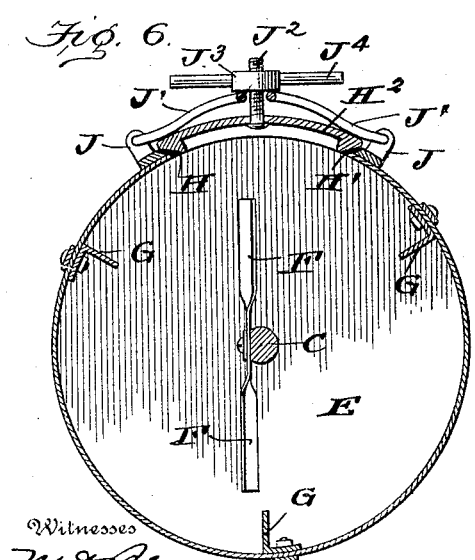
Figure 7:
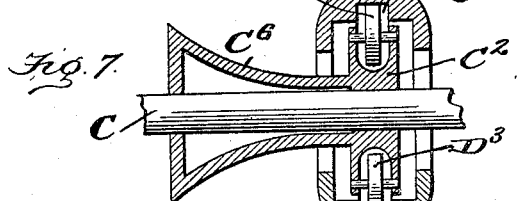
Figure 8:
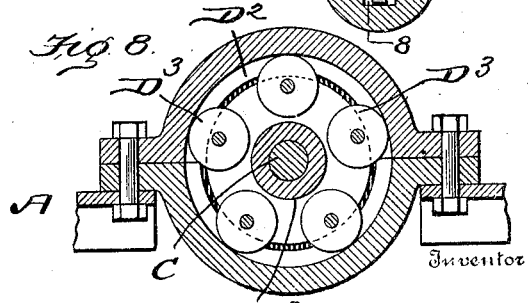

Figure 1 is an end elevation of the device. Fig. 2 is a plan view. Fig. 3 is a diametrical section through the cylinder, the shaft and paddles being shown in elevation. Fig. 4 is a detail sectional view through one of the journal-boxes, the bearings and one of the gears being also shown in section. Fig. 5 is a section through the journal-box at a right angle to that of Fig. 4. Fig. 6 is a transverse section through the cylinder. Fig. 7 is a sectional view of the journal-box and bearing at the opposite end of the cylinder to those shown in Fig. 4. Fig. 8 is a section on the line 8 8 of Fig. 7.

In the drawings, A represents a suitable frame or table having a folding leaf A', on which the butter may be worked. In the frame A, preferably at one end, is journaled in suitable bearings a drive-wheel shaft B, carrying the drive-wheel B', which is provided with a handle $B^2$ and also carries the gear $B^3$. The main shaft C is journaled in bearings mounted on the frame A and runs the length of the frame. At one end this shaft carries a small gear-wheel C', which meshes with the gear $B^3$, formed on the drive-wheel B. The shaft C passes through cylindrical journal-boxes D and D', and mounted loosely on the shaft is the cylinder E. The interior of the boxes D D' is grooved, as shown at $D^2$, and on the shaft C is loosely mounted in each box a grooved wheel $C^2$. In each box are arranged a plurality of antifriction rollers or disks $D^3$, mounted on shafts $D^4$. In the box D the shafts $D^4$ have their ends connected by links $D^5$ to the ends of the shafts of the adjacent rollers, whereby the disks are pivotally connected together and are not connected directly to the box or the wheel $C^2$, and the peripheries of these disks travel in the grooves $D^2$ and in the groove of the wheel $C^2$. In the box D' the groove of the wheel is deeper, and the shafts $D^4$ of the disks $D^3$ are journaled in the sides of the groove of the wheel $C^2$.

From the wheel $C^2$ in the box D extends laterally and toward the cylinders E an integral spider $C^3$, which carries a gear-wheel $C^4$ and also a disk $C^5$, which bears on the outer face of the adjacent head of the cylinder E. The wheel $C^2$ on the shaft C and in the box D' has a spider $C^6$, which bears on the head of the cylinder E adjacent the box D'.

The shaft C passes through inwardly-extending bosses E', carried by the heads of the cylinder or drum E, and these bosses are threaded and flanged collars have their flanges threaded to fit over the bosses, as shown at $E^2$. This makes the cylinder tight, and the disk $C^5$ and spider $C^6$ hold the cylinder against longitudinal movement on the shaft C and serve to steady it while being rotated. The shaft C within the cylinder E is flattened on one side, and the intermediate portions of a plurality of blades F are secured thereto, the end portions of the blades being oppositely twisted with reference to the intermediate portions.

Angle-plates G are bolted to the cylinder on the inside, and these plates are preferably three in number, and they are spaced equidistant from each other and extend from end to end of the cylinder. An opening H is formed in the side of the cylinder, the edges beveled and provided with rubber packing H', and a curved plate $H^2$, also provided with beveled edges, is adapted to close the opening H. Ears J are formed adjacent the opening H, and U-shaped springs J' have their ends secured in the ears J and bear on the plate $H^2$. A threaded rod $J^2$ is carried by the plate $H^2$, and a threaded disk $J^3$ works on the rod $J^2$, the disk carrying a handle-bar $J^4$, by means of which it may be rotated and which also bears on the springs J' and regulates the pressure of the springs on the plate $H^2$.

It will be obvious that rotation of the drive-wheel B' will, through the medium of the gearing shown, rotate the shaft C. To rotate the cylinder E in the direction opposite to the rotation of the shaft C, I provide a gear-wheel B⁴, fixed on the inner end of the shaft B, which meshes with the gear-wheel C⁴ and rotates same and the disk C⁵, which is in close contact with the head of the cylinder E and, if desired, may be pinned to the same or may impart rotation to the cylinder E in the manner of a friction-clutch. In any event the rotation of the cylinder E will be in a direction opposite to that of the shaft C regardless of the direction of the shaft rotation.

A discharge-spout K is provided in the side of the cylinder E, and this spout may be closed by any suitable kind of plug.

Having thus fully described my invention, what I claim as new, and desire to secure by Letters Patent, is—

1. In a churn, a cylinder, a shaft passing loosely through the said cylinder, blades of the shaft within the cylinder, a journal-box, the shaft passing loosely through the said journal-box, the said box being interiorly and circumferentially grooved, a grooved wheel loosely mounted on the shaft within the journal-box, a plurality of shafts in the journal-box, disks on said shafts, said disks extending into the grooves of the box and the wheel, links connecting the said shafts, a spider formed integral with the said wheel, a friction-disk carried by the spider and in engagement with an end of the cylinder, and means for rotating the first-mentioned shaft in one direction and the spider in the opposite direction.

2. A device of the kind described comprising a shaft, a cylinder loosely mounted thereon, blades carried by the shaft within the cylinder, a shaft parallel to the first-mentioned shaft, a drive-wheel thereon, a gear carried by the drive-wheel, a gear-wheel on the first-mentioned shaft adapted to mesh with that on the drive-wheel, a gear-wheel on the second-mentioned shaft, a spider carried by the shaft first mentioned, a gear formed on the spider and adapted to mesh with the gear on the second shaft, and a friction-disk carried by the spider and adapted to engage the cylinder-head.

NELS T. HANSON.

Witnesses:
S. Van Sickle,
C. D. Muxen.